Nov. 18, 1924. 1,516,358
L. B. THOMAS
STORAGE SYSTEM
Filed May 7, 1923
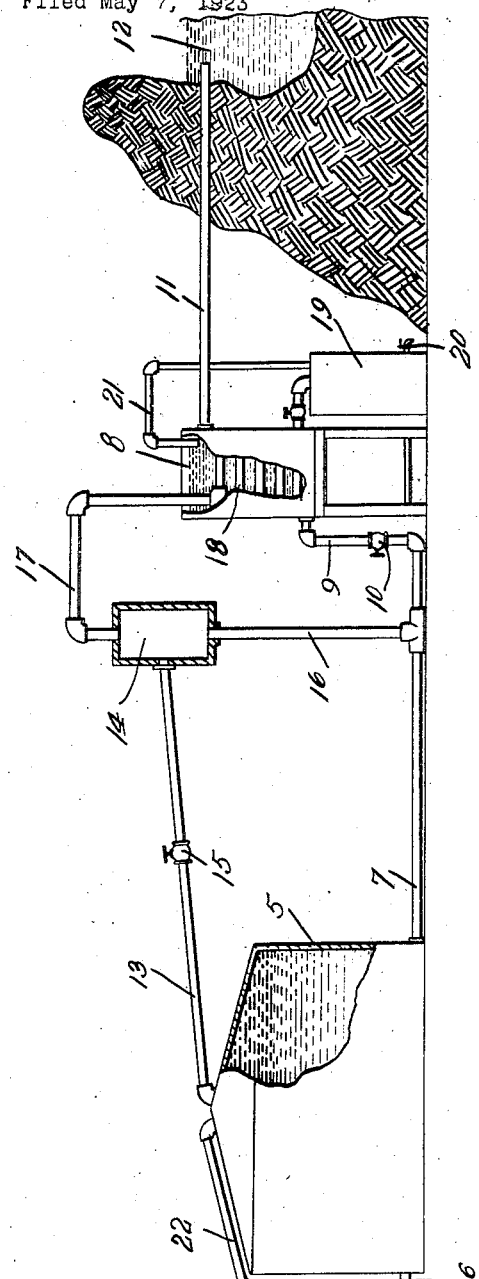
L. B. Thomas,
Inventor
By C. A. Snow & Co.,
Attorney Patented Nov. 18, 1924.

1,516,358

UNITED STATES PATENT OFFICE.

LUTHER B. THOMAS, OF SHREVEPORT, LOUISIANA.

STORAGE SYSTEM.

Application filed May 7, 1923. Serial No. 637,380.

*To all whom it may concern:*

Be it known that I, LUTHER B. THOMAS, a citizen of the United States, residing at Shreveport, in the parish of Caddo and State of Louisiana, have invented a new and useful Storage System, of which the following is a specification.

This invention relates to storage systems, and more particularly to storage systems especially designed for storing oils and other inflammable liquids.

The primary object of the invention is to provide means to prevent gas from collecting above the level of the oil within the tank, thereby insuring against the oil in the tank being ignited by natural causes.

Another object of the invention is to provide means to carry off such gases as may be generated, means being provided for condensing the gases at a point remote from the storage tank.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings:

The figure illustrates a diagrammatical view of the system, disclosing the main storage tank and condensing tank partly broken away.

Referring to the drawing in detail, the reference character 5 designates an oil storage tank, which is of the usual construction, and is fed with oil through the pipe 6 that enters the tank at the base thereof.

Water enters the tank 5 through the pipe 7 which is in communication with the auxiliary supply tank 8 through the pipe 9, a valve 10 being provided in the pipe 9 to control the passage of water to the tank 5.

As shown, the water fed to the tank 8, through the supply pipe 11, assumes a level in the tank 8 equal with the level of the water in the reservoir 12. Thus it will be seen that water enters the tank 8, from where it is fed to the tank 5. Communicating with the tank 5 at a point adjacent to the top thereof, is a pipe 13 which also has connection with the separator 14, the passage of fluid through the pipe 13 being controlled by the valve 15 so that gas may be carried off from the tank, the tank 14 taking care of condensation to return the liquid to the tank 5.

As shown, the separator 14 communicates with the return pipe 7, through the pipe 16. A pipe 17 establishes communication between the separator 14 and the coil 18, whereby the gas passing from the separator may enter the coils 18 to condense the same. Condensates from the coil 18 are fed to the tank 19, where the same may be carried off through valve 20.

Communicating with the tank 19 is a pipe 21 that has one end thereof disposed in the tank 8 whereby uncondensed gas may pass from the tank 19 into the water of the tank 8 part of the gas being absorbed by the water and carried through the pipes 9 and 7 to be returned to the tank 5.

In order that the oil may be removed from the tank 5, a discharge pipe 22 is provided and carries off the fluid to any suitable tank or pipes.

From the foregoing it is obvious that due to this construction, the oil which floats on the surface of the water is held into contact with the undersurface of the top of the tank 5 to the end that there is no space above the oil in the tank for collection of gas.

While I have shown and described a reservoir for supplying water to the tank 5, it is to be understood that a suitable supply tank may be employed in lieu of the reservoir.

Having thus described the invention, what is claimed as new is:—

1. An oil storage system including a storage tank having a closed top and bottom a pipe for supplying oil to the tank, a pipe leading from a source of water supply and adapted to supply water to the tank, at the base thereof to maintain the oil in engagement with the top of the tank, a separator and a condenser in communication with the tank, and adapted to condense vapors and return the condensates to the storage tank.

2. An oil storage system including a storage tank having a closed top and bottom, a pipe for supplying water under pressure to the bottom of the tank to force the oil to the top of the tank, a separator tank disposed above the storage tank and adapted to receive vapors from the storage tank, a pipe between the storage tank and separator tank for returning gasoline to the storage tank at the base thereof, and a condenser adapted to condense vapors arising from the separator and return the condensates to the storage tank.

In testimony that I claim the foregoing as my own, I have hereto affixed my signature in the presence of two witnesses.

LUTHER B. THOMAS.

Witnesses:
J. E. RICHARDSON,
S. S. TAITS.